United States Patent [19]

Gibbons et al.

[11] Patent Number: 4,962,495
[45] Date of Patent: Oct. 9, 1990

[54] APPARATUS AND METHOD FOR TRANSMITTING CONDITION DATA FROM A ROTATING MEMBER TO A STATIONARY DEVICE

[75] Inventors: Charles B. Gibbons, Whitesboro; Victor R. Abate, Utica, both of N.Y.

[73] Assignee: Lucas Aerospace Power Transmission Corp., Utica, N.Y.

[21] Appl. No.: 252,632

[22] Filed: Oct. 3, 1988

[51] Int. Cl.⁵ ...................... H04J 14/00; H04B 10/00
[52] U.S. Cl. ...................................... 370/1; 455/603; 340/870.29
[58] Field of Search ...................... 340/870.28, 870.29; 455/603, 600, 602, 605, 606, 607, 608, 612, 617; 370/1, 3, 4

[56] References Cited

U.S. PATENT DOCUMENTS

| | | | |
|---|---|---|---|
| 4,011,551 | 3/1977 | Addler | 340/870.28 |
| 4,109,998 | 8/1978 | Iverson | 340/870.29 |
| 4,175,230 | 11/1979 | Richards | 455/609 |
| 4,242,666 | 12/1980 | Reschovsky | 340/870.28 |
| 4,310,767 | 1/1982 | Peacock | 455/602 |
| 4,404,559 | 9/1983 | Renner | 340/870.28 |
| 4,518,962 | 3/1985 | Imose | 340/870.28 |
| 4,660,036 | 4/1987 | Mosier | 340/870.29 |
| 4,672,214 | 6/1987 | Takahashi | 455/602 |
| 4,753,506 | 6/1988 | Einhorn | 455/612 |
| 4,837,556 | 6/1989 | Matsushita | 455/605 |

FOREIGN PATENT DOCUMENTS

| | | | |
|---|---|---|---|
| 1259320 | 9/1986 | U.S.S.R. | 455/603 |
| 1383431 | 3/1988 | U.S.S.R. | 455/603 |
| 2074313 | 10/1981 | United Kingdom | 455/603 |

OTHER PUBLICATIONS

Advance Technical Information—Torximitor TM, Bently, Nevada, P.O. Box 157, Minden, Nev. 89423.

Primary Examiner—Joseph A. Orsino
Assistant Examiner—L. Van Beek
Attorney, Agent, or Firm—Anthony F. Cuoco

[57] ABSTRACT

Apparatus and method for transmitting condition data from a rotating member to a stationary device is disclosed wherein digitized data obtained from a plurality of sensors is transmitted from the rotating member to the stationary device through a system of light emitting diodes on the rotating member which flash light signals in a preselected digital sequence. The data so obtained is received by a system of stationary receivers, and thereafter decoded and processed for utilization. Electric power for the rotating components is obtained by using the kinetic energy of the rotating member.

16 Claims, 3 Drawing Sheets

APPARATUS AND METHOD FOR TRANSMITTING CONDITION DATA FROM A ROTATING MEMBER TO A STATIONARY DEVICE

BACKGROUND OF THE INVENTION

This invention relates generally to apparatus and method for accurately transmitting condition data from an inaccessible device such as a rotating member to an accessible or stationary device such as a display or recording device. More particularly, this invention relates to an optical/electrical system for transmitting analog data from the rotating member and converting said analog data to digital data for use by the stationary device.

It is desirable for a variety of reasons to discern information regarding conditions of a rotating member such as a shaft or the like. This information includes torque as measured by a system of strain gauges, temperature as measured by a system of thermocouples, and other parameters as measured by an appropriate sensor or sensors.

The major problem in obtaining condition information from rotating or inaccessible members is transmitting the information accurately and reliably from the rotating environment to an accessible or stationary environment so that said transmitted data can be used. Prior to the present invention, apparatus for the purposes described has relied upon either AM or FM radio equipment, slip rings, or rotary transformers. These devices have proven to have excessive errors and have been heavy and bulky, and require significant electrical power. For apparatus which operates in hazardous environments such as in oil refineries and chemical plants, the electrical power required precludes the apparatus from meeting safety requirements. Additionally, when rotary transformers are used, the amount of data which can be effectively transmitted is often limited by cross-talk in the rotary transformer. Further, the prior art devices have been known to suffer from electrical/magnetic interference of one type or another, which further deteriorates their accuracy and reliability.

The present invention is an improvement over the prior art in that it uses fiber optic technology to transmit the data from the rotary member. The data transmission system includes an arrangement of infrared light emitting diodes (LEDs) on the rotating member and a system of stationary optical receivers mounted around the rotating member. During operation the data from the rotating member is accurately transmitted by actuating the rotating LEDs in a preselected digital sequence. The light signals so provided are received by the stationary receivers and transmitted through a fiber optic channel to utilization means including a computer or the like for operating a display device or a recording device, as the case may be.

SUMMARY OF THE INVENTION

This invention contemplates apparatus and method for transmitting condition data from a rotating member to a stationary device and includes both rotating and non-rotating components.

The rotating components include at least one but preferably a plurality of sensors for sensing predetermined rotating member conditions and for providing corresponding analog signals, and signal acquisition and converter circuitry including a multiplexer, a sample and hold circuit, and an analog to digital converter. The rotating components further include an arrangement of light emitting diodes, logic circuitry and a power generator. The signal acquisition and conversion circuitry is controlled by the logic circuitry whereby an arrangement is provided for continuously sampling the analog signals so that the infrared light emitting diodes output raw data. All of these components except for the LEDs and the power generator are mounted internal the rotating member. The LEDs and power generator are mounted on the surface of and external said member.

The non-rotating components include a system of optical receivers, a fiber optic bundle, a decoder, a host computer and apparatus connected to the computer for displaying, recording or otherwise utilizing data provided thereby.

The method of the invention includes obtaining analog data from the rotating member at a predetermined sampling rate; digitizing the analog data; encoding the digital data into a digital code; transmitting the digital code by flashing a system of infrared LEDs in a coded digital sequence for providing light pulses; detecting the light pulses; transmitting the detected light pulses through a fiber optic bundle for decoding and converting to digital signals; and processing the digital signals for use such as for displaying or automatic data recording.

DETAILED DESCRIPTION OF THE INVENTION

Figure 1:
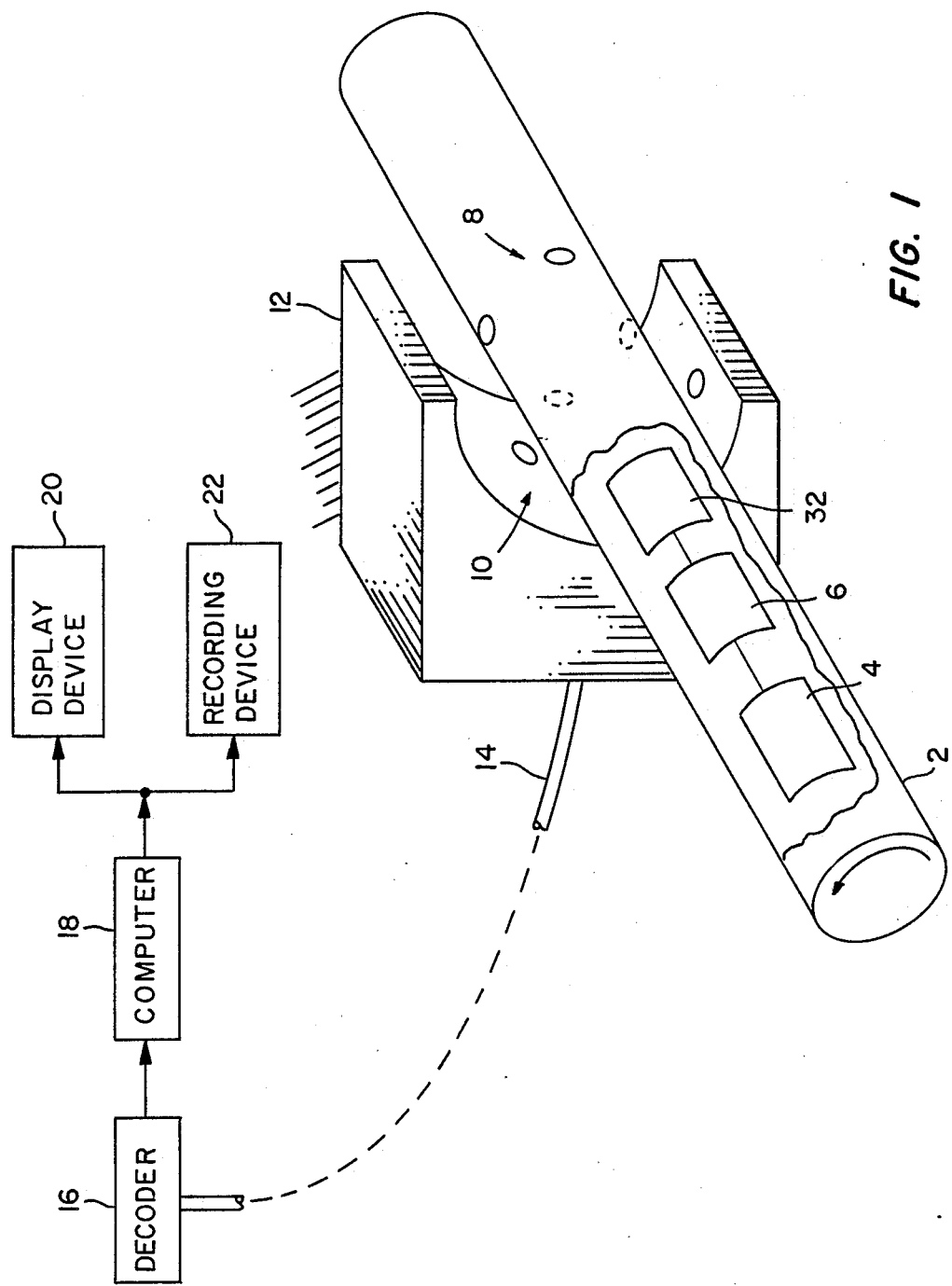
FIG. 1 is a diagrammatic representation generally illustrating the invention.

With reference first to FIG. 1, a rotating member is designated by the numeral 2 and rotates in a direction such as, for example, designated by the arrow.

Internal rotating member 2 is disposed an arrangement of at least one but preferably a plurality of analog sensors designated generally by the numeral 4. Sensor arrangement 4 includes a sensor or sensors such as, but not limited to, strain gauges, thermocouples, and other sensors for sensing conditions of rotating member 4, as may be desired, and for providing corresponding analog electrical signals.

Figure 2:
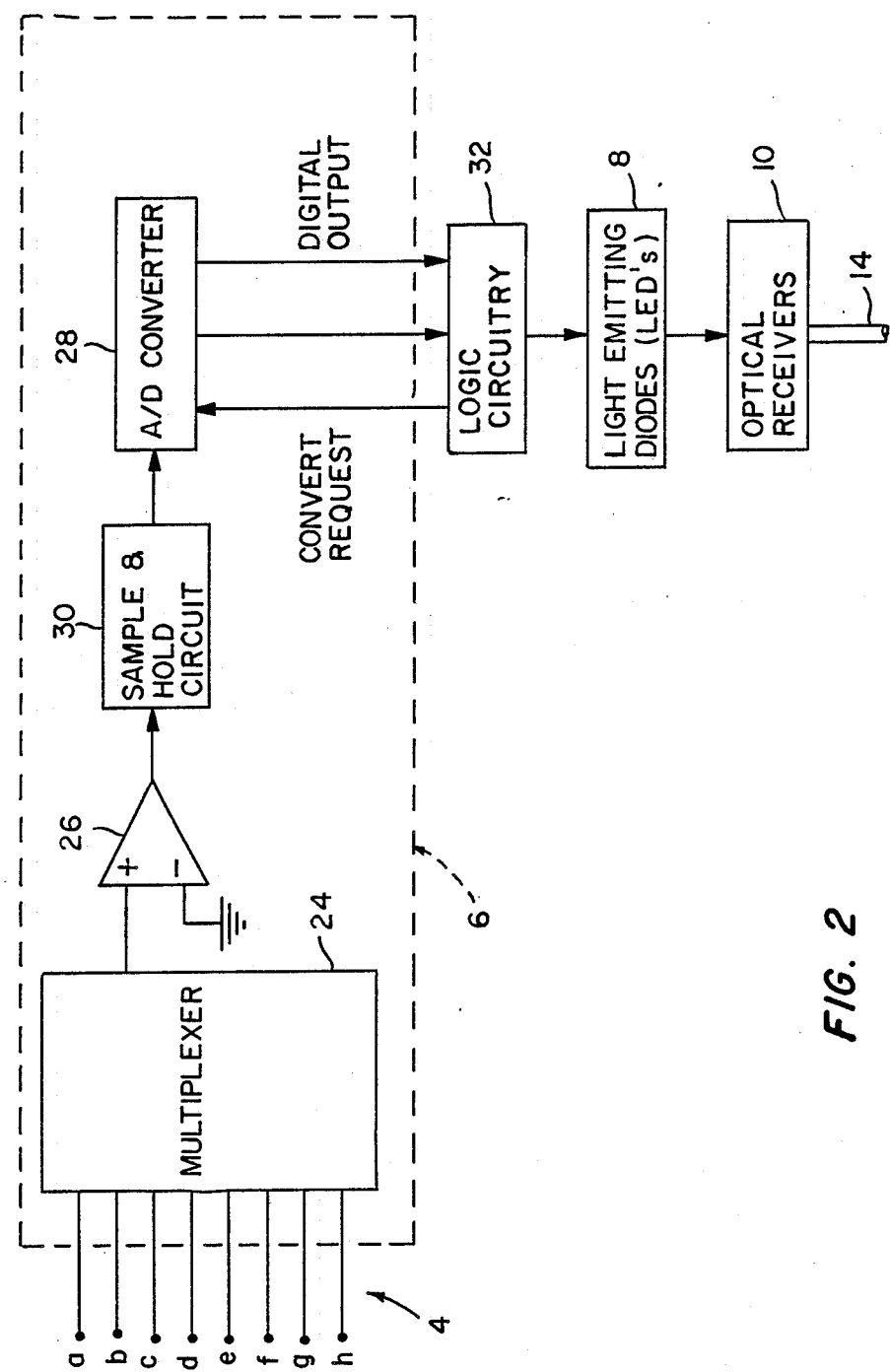
FIG. 2 is a block diagram illustrating the signal acquisition and conversion arrangement of the invention.

Sensors 4 are electrically connected to data and acquisition circuitry designated generally by the numeral 6 likewise disposed internal rotating member 2. The components included in data acquisition circuitry 6 are shown in FIG. 2 and will hereinafter be more fully described. The data and acquisition circuitry is connected to logic circuitry 32.

A system of infrared light emitting diodes (LEDs) is designated generally by the numeral 8 and which system of LEDs is disposed external rotating member 2 on the surface thereof. Sensor arrangement 4, acquisition and conversion circuitry 6, logic circuitry 32 and LEDs 8 rotate with rotating member 2.

A system of optical receivers is designated by the numeral 10 and is mounted via a suitable housing or the like 12 so as to be stationary.

A fiber optic bundle or the like 14 leads from receivers 10 through housing 12 to a decoder 16. Decoder 16 converts light signals from receivers 10 transmitted through fiber optic bundle 14 to electrical digital signals. The electrical digital signals from decoder 16 are applied to a processing unit or computer 18 for suitable signal processing, and therefrom to utilizing apparatus such as, for example, a display device 20 and/or a recording device 22.

Referring now to FIG. 2, sensor arrangement 4 is shown as including a plurality of sensors such as eight in number and designated as a–h. In the preferred embodiment of the invention up to sixteen sensors may be accommodated.

Sensors a–h are connected to a multiplexer 24 included in acquisition and conversion circuitry 6. Multiplexer 24 selects any desired analog input from sensors a–h. When considering multiplexer 24, particular note should be given to the internal timing which controls the switching from one multiplexer channel to the next. In this regard a "break before make" multiplexer is required since this allows for delay between disconnection from the previous multiplexer channel and connection to the next channel, thus assuring that no input channels are ever momentarily connected together to cause an invalid multiplexer output.

The output from multiplexer 24 is applied to an amplifier 26 for amplifying the multiplexer output to match a predetermined voltage range of an analog to digital converter 28. A particular consideration regarding amplifier 26 is settling time. Before multiplexer 24 switches to a new output signal, it is important that the amplifier be allowed to settle acceptably close to its final value. In this connection it is noted that settling time is gain dependent, i.e. generally increasing at higher gain ranges.

The output from amplifier 26 is applied to a sample and hold circuit 30. Sample and hold circuit 30 receives the amplifier output, stores it and supplies analog to digital converter 28 with a stable voltage level during conversion.

In accordance with the preferred embodiment of the invention analog to digital converter 28 should have a resolution of one part per thousand, requiring a ten bit analog to digital converter. The converter should also include an appropriate interface for logic circuitry 32.

Logic circuitry 32, which may be a microprocessor or the like, may have sufficient program storage capacity for: cycling the multiplexed analog to digital converted outputs through the active analog channels at a preselected sampling rate; comparing the signal values against a stored "look-up" table for correction of known non-linearities, temperature errors, etc.; checking the signals for maximum or minimum levels and storing new maximum or minimum levels, and storing current signal values; after a preselected number of sampling cycles transmitting the stored data from memory for flashing light emitting diodes 8 in a preselected digital sequence; and repeating said sequence. In this regard it is noted that the program may be stored in erasable program read only memory form and can differ for each different application of the apparatus. Such differences may include, for example, sensor sampling pattern, sampling rate, data storage, and data value correction algorithms.

In regard to logic circuitry 32, the circuitry may merely include an arrangement for controlling the cycling of the multiplexed analog to digital converted outputs through the active analog channels at the preselected sampling rate. The logic circuitry will then output the raw digitized data so obtained via LEDs 8. All of the data correction algorithms and supporting software would be in stationary computer 18. Computer 18 may then compare the signal values against a stored "look-up" table for correction of known non-linearities temperature errors, etc.; check the signals for maximum or minimum levels; and store current signal values. As aforenoted with regard to logic circuitry 32, the required program may be stored in erasable program read only memory form in computer 18 and can likewise differ for each application of the apparatus. Such differences may include sampling pattern, sampling rate, data storage, and data value correction algorithms, as the case may be.

As will now be understood, the digitized data gathered from the several sensors in sensor arrangement 4 is transmitted from a rotating to a non-rotating environment by using a system of infrared light emitting diodes 8 on the rotating member and flashing the diodes in a preselected digital sequence. The digital light signals are then received by a system of stationary optical receivers 10.

The light emitting diodes in system 8 must have sufficient intensity so that the light therefrom is detected by receivers 10 with at least a moderate amount of oil and dirt or the like, obscuring the light emitting diodes and the receivers. In order for the light to be detected for any relative rotation position of member 2 more than one light emitting diode is required, and also more than one receiver is required as will now be understood.

Once the transmitted digital light signals have been received they are transmitted to computer 18 via decoder 16 through fiber optic bundle 14. The computer receives the decoded signals and uses the signals according to a stored program, i.e. applies the signals to display device 20 or to recording device 22, as the case may be.

Figure 3:
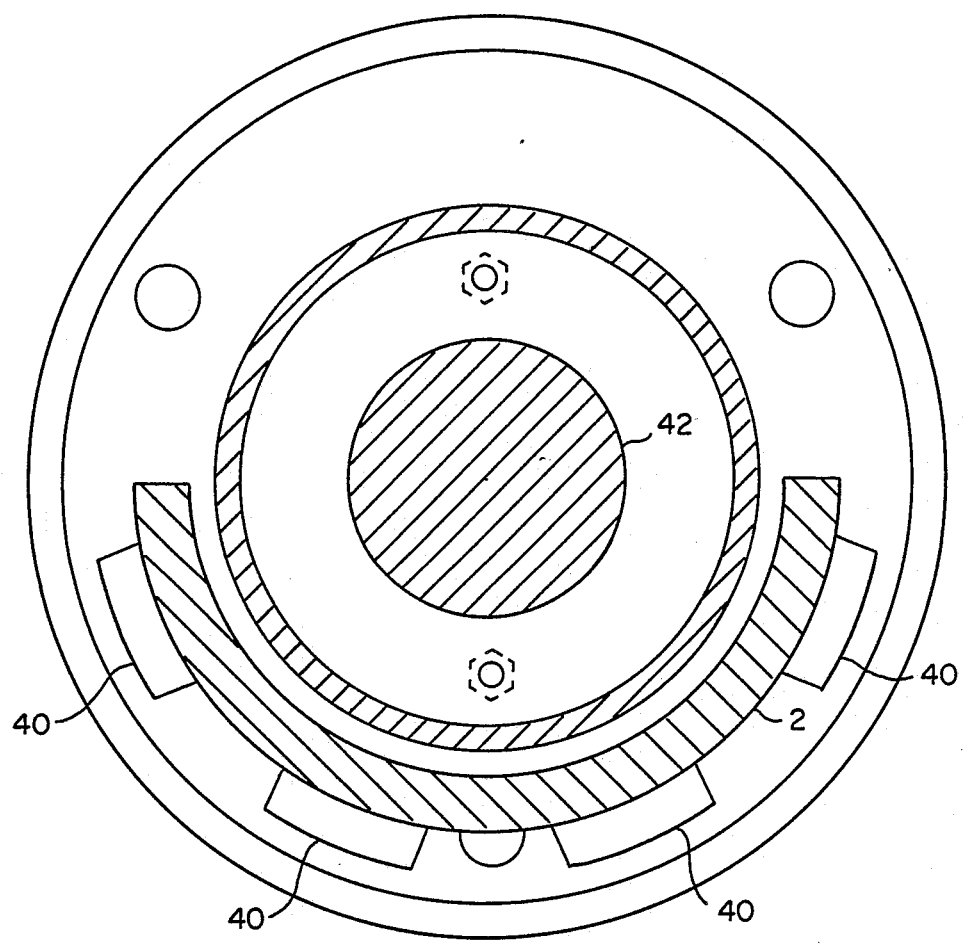
FIG 3 is a diagrammatic representation illustrating power generating means incorporated into the invention.

Electrical power is required for energizing the several components mounted internal rotating member 2. As best shown in FIG. 3 an arrangement is provided which makes use of the kinetic energy of the rotating member to provide this electrical power. Thus, with reference to the Figure, a plurality of fixed permanent magnets 40 are disposed around the outside of member 2 to thereby create a magnetic field. A coil (not otherwise shown) is disposed internal the member which, for the purposes described is non-magnetic. An AC voltage will be generated as member 2 rotates. The arrangement is such that this voltage will be suitably rectified and regulated as is well known in the art to power the rotating components as may be required. A battery 42 disposed internal member 2 may also be provided for inservice non-rotating checkout and for start-up speeds too slow for self-power generation as aforenoted.

In practicing the invention as heretofore described, the analog signals from sensor arrangement 4 provide data from rotating member 2 at a predetermined sampling rate. These analog signals are digitized and the digital code is transmitted across the rotating interface by flashing a system of infrared light emitting diodes, which are mounted on the rotating member, in a coded digital sequence. The light signals so provided are detected by a system of stationary optical receivers. The light signals so detected are transmitted through a fiber optic bundle to an infrared light decoder and converted to electrical digital signals. The electrical digital signals are applied through a suitable processing unit (computer) for display or automatic data recording, or other utilization, as may be required.

Signal acquisition and conversion circuitry 6 can be in the form of several chips, or a single chip such as that carrying the trade designation HS-9403 as marketed by Hybrid Systems, Inc. Such a chip incorporates multiplexer 24, amplifier 26, sample and hold circuit 30 and analog to digital converter 28. Logic circuitry 32 may be in chip form for continuously and autonomously scanning through the plurality of analog input channels as is well known in the art, and controlling analog to digital converter 28 to convert the signals from sample and hold circuit 30 via a "convert request" output to provide an appropriate digital output.

Light emitting diode arrangement 8 should be capable of operating in significant ambient temperature extremes and under significant accelerations as will be readily discerned. An LED diode arrangement of the type described carries the trade designation OD-800W as marketed by Opti-Diode, Inc. For the purposes described computer 18 may be a device carrying the trade designation BC52 as marketed by Micromint, Inc. A computer of this type is easily programmable and has the required capability for linearization and control functions, as desired.

With the above description of the invention in mind, reference is made to the claims appended hereto for a definition of the scope of the invention.

What is claimed is:

1. Apparatus for transmitting rotating member condition data from the rotating member to a stationary device comprising:

sensor means arranged to rotate with the rotating member for sensing predetermined rotating member conditions and for providing corresponding electrical analog signals;

means arranged to rotate with the rotating member connected to the sensor means for acquiring the analog signals therefrom and for converting said signals to digital signals including multiplexer means connected to the sensor means for selecting the electrical analog signals therefrom and for outputting the selected signals in a predetermined sequence, sample and hold means connected to the multiplexer means for sampling and holding the electrical analog signals outputted thereby and for providing sampled signals at a predetermined rate, analog to digital converter means and for converting the sampled signals to digital signals, and means connected between the multiplexer means and the sample and hold means for adjusting the amplitude of the signals outputted by said multiplexer means so that said amplitudes match a predetermined amplitude range of the analog to digital converter means;

means arranged to rotate with the rotating member connected to the acquiring and converting means to control said means to acquire and convert the analog signals to digital signals, and responsive to the digital signals for providing electrical signals in accordance with a predetermined digital code;

means arranged to rotate with the rotating member connected to the means for providing electrical signals in accordance with a predetermined digital code and responsive to the signals therefrom for providing light signals in accordance with said digital code;

means connected to the means for providing the light signals for receiving said signals;

a decoder;

light transmitting means coupled to the receiving means and to the decoder for transmitting the light signals received in accordance with the digital code from the output of the receiving means to the decoder, with the input of the decoder decoding the transmitted signals and providing corresponding electrical digital signals; and means connected to the decoder for utilizing the electrical digital signals.

2. Apparatus as described by claim 1, wherein:
the means for providing light signals includes an arrangement of light emitting diodes.

3. Apparatus as described by claim 1, wherein:
the light transmitting means includes a fiber optic bundle.

4. Apparatus as described by claim 1, wherein the means connected to the acquiring and converting means includes:

means connected to the analog to digital converter means and responsive to the digital signals therefrom for initiating a conversion of the sampled signals, whereby digital signals are provided, and responsive to said provided digital signals for providing the electrical signals in accordance with the predetermined digital code.

5. Apparatus as described by claim 1, wherein:
the sensor means, the acquiring and converting means and the means for providing electrical signals in accordance with a predetermined digital code are disposed internal the rotating member for rotating therewith; and the means for providing light signals is disposed external the rotating member and on the surface thereof for rotating therewith.

6. Apparatus as described by claim 1, wherein:
the receiving means, the decoder, the light transmitting means and the utilizing means are disposed external the rotating member and are stationary.

7. Apparatus as described by claim 1, wherein the utilizing means includes:

processor means connected to the decoder for processing the signals therefrom and for providing processed signals; and means connected to the processor means and responsive to the processed signals for indicating the sensed rotating member conditions.

8. Apparatus for transmitting rotating member condition data from the rotating member to a stationary device comprising:

sensor means arranged to rotate with the rotating member for sensing predetermined rotating member conditions and for providing corresponding electrical analog signals;

means arranged to rotate with the rotating member connected to the sensor means for acquiring the analog signals therefrom and for converting said signals to digital signals means arranged to rotate with the rotating member connected to the acquiring and converting means to control said means to acquire and convert the analog signals to digital signals, and responsive to the digital signals for providing electrical signals in accordance with a predetermined digital code;

means arranged to rotate with the rotating member connected to the means for providing electrical signals in accordance with a predetermined digital code and responsive to the signals therefrom for providing light signals in accordance with said digital code;

means connected to the means for providing the light signals for receiving said signals;

a decoder;

light transmitting means coupled to the receiving means and to the decoder for transmitting the light signals received in accordance with the digital code from the output of the receiving means to the decoder, with the input of the decoder decoding the transmitted signals and providing corresponding electrical digital signals;

means connected to the decoder for utilizing the electrical digital signals; and means arranged to rotate with the rotating member and utilizing the kinetic energy of said member for generating electrical power for the sensor means and for the several means arranged to rotate with said rotating member.

9. A method for transmitting rotating member condition data from the rotating member to a stationary device, comprising:

providing electrical analog signals corresponding to rotating member condition data at a predetermined sampling rate;

digitizing the analog signals;

encoding the digitized signals into a predetermined digital code;

converting the digitized signals into light signals;

optically receiving and detecting the light signals;

transmitting the received and detected light signals to a decoder;

decoding the transmitted light signals for providing electrical digital signals;

processing the electrical digital signals and providing processed signals;

utilizing the processed signals for indicating rotating member conditions; and utilizing the kinetic energy of the rotating member for generating electrical power for providing the electrical analog signals, digitizing said signals, encoding the digitized signals and converting the digitized signals into light signals.

10. A method as described by claim 9, wherein providing electrical analog signals corresponding to rotating member condition data at a predetermined sampling rate includes:

sensing the rotating member condition data and providing the electrical analog signals corresponding to said condition data;

selecting the analog signals and outputting the selected signals in a predetermined sequence; and sampling the outputted signals at the predetermined rate.

11. A method as described by claim 9, wherein digitizing the analog signals includes:

converting the sampled outputted signals into digital signals.

12. A method as described by claim 11, wherein encoding the digitized signals into a predetermined digital code includes:

controlling the converting of the sampled outputted signals into digital signals so that the digital signals are in accordance with the predetermined digital code.

13. A method as described by claim 12, wherein converting the digital signals into light signals includes:

utilizing the digital signals for energizing light sensitive means in accordance with the digital code for providing the light signals.

14. A method as described by claim 9, wherein transmitting the light signals to a decoder includes:

coupling a fiber optic bundle to the light sensitive means and to the decoder.

15. A method as described by claim 9, including:

providing the electrical analog signals corresponding to rotating member condition data, digitizing the analog signals and encoding the digitized signals into a predetermined code internal the rotating member; and converting the digitized signals into light signals on the surface of and external the rotating member.

16. A method as described by claim 9, including:

receiving and detecting the light signals, transmitting the light signals to a decoder, decoding the transmitted light signals for providing electrical digital signals, processing the digital signals and providing processed signals, and utilizing the processed signals in a stationary environment.

* * * * *